United States Patent
Lahr et al.

(10) Patent No.: US 7,158,014 B2
(45) Date of Patent: Jan. 2, 2007

(54) POST-TRIP BUS INSPECTION ALERT SYSTEM

(75) Inventors: Jeremy A. Lahr, Columbia City, IN (US); Allyson K. Kreft, Fort Wayne, IN (US); Marilyn R. Miars, LaOtto, IN (US); Douglas R. Taylor, Fort Wayne, IN (US); Clark L. Backlund, New Haven, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 155 days.

(21) Appl. No.: 11/079,817

(22) Filed: Mar. 14, 2005

(65) Prior Publication Data

US 2006/0208862 A1   Sep. 21, 2006

(51) Int. Cl.
B60Q 1/26 (2006.01)
(52) U.S. Cl. ............... 340/433; 340/456; 340/480; 340/487; 340/545.4; 340/425.5; 340/468; 116/28 R
(58) Field of Classification Search .......... 340/433, 340/456, 480, 487, 545.4, 425.5, 468; 116/28 R
See application file for complete search history.

(56) References Cited

U.S. PATENT DOCUMENTS

| | | | |
|---|---|---|---|
| 5,128,651 A | | 7/1992 | Heckart |
| 5,243,323 A | | 9/1993 | Rogers |
| 5,293,151 A | * | 3/1994 | Rose ................ 340/433 |
| 5,357,239 A | * | 10/1994 | Lamparter ........... 340/433 |
| 5,874,891 A | | 2/1999 | Lowe |
| 6,107,915 A | | 8/2000 | Reavell et al. |
| 6,259,358 B1 | | 7/2001 | Fjordbotten |
| 6,765,481 B1 | * | 7/2004 | Haigh et al. .......... 340/433 |
| 2003/0030550 A1 | | 2/2003 | Talbot |

* cited by examiner

*Primary Examiner*—Tai Nguyen
(74) *Attorney, Agent, or Firm*—Jeffrey P. Calfa; Gerald W. Askew; Susan L. Lukasik

(57) ABSTRACT

A system and method for alerting responsible personnel to perform a post-trip inspection check for passengers remaining on a bus at the end of a trip by issuing audible and/or visual alerts when the bus is parked and the motor shut off at the end of the trip. The ignition switch (47) must be placed in ACCESSORY position and a park brake applied for the system to be rendered capable of being disarmed by operation of a disarming device (45S) at the rear of the bus. Operation of the disarming device is indicated by a correct sequence of operating conditions of the device, namely first non-actuated, then actuated, and then non-actuated. The system includes a SNOOZE state that allows the ignition switch to be temporarily turned off during a trip and the alert to be stopped by pressing a snooze switch.

23 Claims, 10 Drawing Sheets

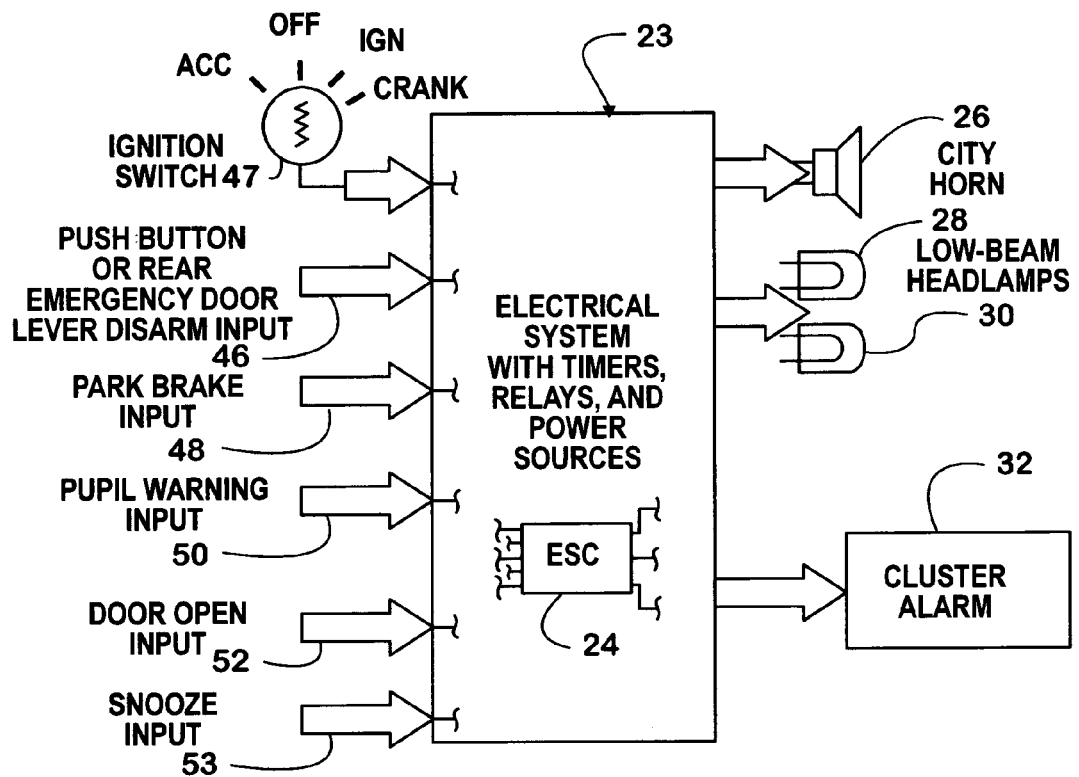
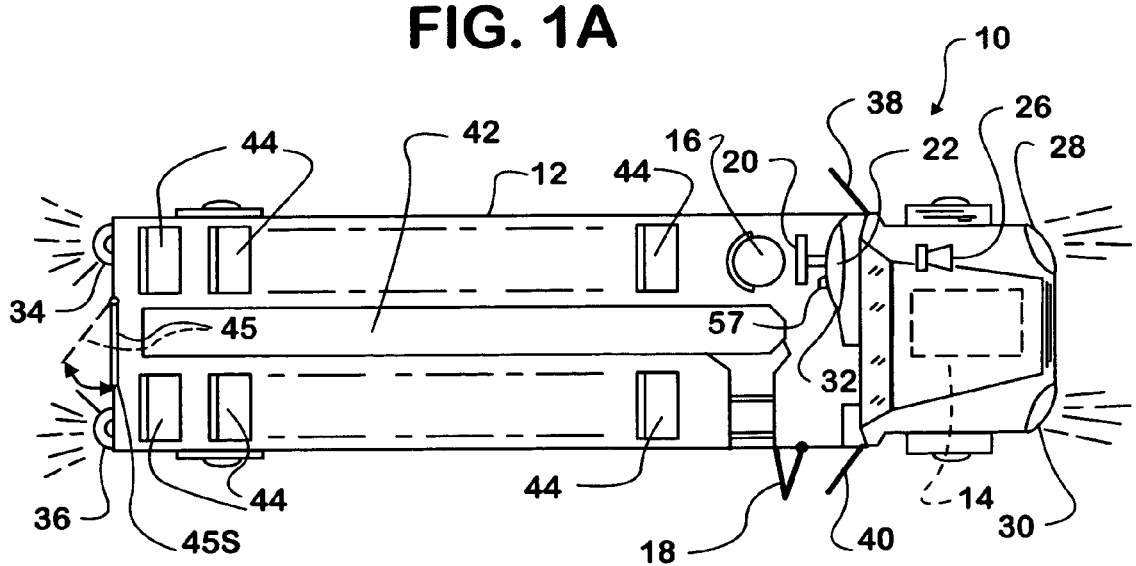

POST-TRIP BUS INSPECTION ALERT SYSTEM

FIELD OF THE INVENTION

This invention relates to motor vehicles that are capable of transporting a large number of people at one time, school busses being prime examples. More particularly, the invention relates to the electrical systems of such vehicles that are equipped with post-trip inspection alert systems for alerting responsible persons, such as school bus drivers, to walk to the rear of their busses at the end of each trip during which pupils have been transported to make sure that none remain inside, and continuing the alert for some interval of time so long as a device at the rear of a bus fails to be manually operated after the end of a pupil-carrying trip so to alert not only the bus driver but also anyone else in the immediate vicinity that a responsible person has not walked to the rear of the vehicle to check for pupils left on board.

BACKGROUND OF THE INVENTION

Certain motor vehicles that transport people in substantial numbers at one time, such as school busses, are required by law and/or regulation to comply with certain requirements related to the well-being of the people they transport, school pupils in the case of school busses. A typical school bus has a front entrance/exit door at a side of the vehicle opposite the driver's seat, and a center aisle running from front to rear with a row of seats along each side of the aisle.

As a school bus is preparing to stop to pick up or drop off pupils at various locations along a route, it gives certain signals to other vehicles in the immediate vicinity as an indication that it is coming to a stop for a pick-up. The driver may operate one or more switches to begin flashing certain exterior lamps and/or deploy stop signs at the sides of the bus, or such signals may be issued automatically in one way or another based on conditions indicating that the bus is about to stop for a pick-up or drop-off.

Once the bus has been brought to a complete stop, the front entrance/exit door is opened to allow pupils to board or exit the bus. After the pupils have entered and seated themselves, or alternatively exited, the door is closed. After that, the flashing lamps are extinguished, the deployed stop signs are retracted, and the bus proceeds to the next stop.

Upon the last pupil or pupils having been dropped off, the bus typically proceeds to its final destination which may be on school premises or in a parking yard for school busses not necessarily on the premises of any school.

A number of incidents have been publicly documented where one or more pupils have been left inside a bus after the bus has been parked and the driver has left. These are situations that obviously should not have occurred, but for whatever reason or reasons, actually did.

In efforts to minimize the risk that such incidents might occur in the future, it has been proposed to equip the electrical systems of school buses with systems for alerting responsible persons, chiefly the bus driver, to walk to the rear of the bus at the end of each trip during which pupils have been transported to make sure that none remain inside. Such systems typically rely on the manual actuation of a device near the rear of the bus as an indication that a responsible person has in fact walked to the rear of the bus.

Upon the bus being parked at the end of a trip, a typical system will give an alarm of some sort to alert the driver and possibly other individuals in the immediately vicinity of the need to check the bus for any remaining pupils. If the device at the rear of the bus continues not to be manually actuated within some interval of time after the bus has been parked and the motor shut off, the alarm will continue. In some systems, the driver is given the option of delaying the alarm for a limited time after the expiration of which the failure to have actuated the device at the rear of the bus will cause the alarm to be given.

U.S. Pat. Nos. 5,128,651, 5,874,891, 6,107,915, and 6,259,358 B1 and U.S. Patent Application Publication No. 2003/0030550 A1 describe various systems that require manual actuation of a device at the rear of a bus as an indicator that a responsible person has walked to the rear to check for any persons remaining on the bus after they should have de-boarded. They disclose various conditions for arming and disarming the systems, various conditions for triggering alarms, and various conditions for allowing alarms to be turned off.

In some systems like that of U.S. Pat. No. 5,128,651, operation of the vehicle's ignition switch to OFF position is effective to give an alarm. U.S. Pat. No. 5,128,651 allows for the ignition switch to be turned from OFF to ON to silence an alarm without having to manually operate a device at the rear of the bus, but when the ignition switch is again turned to OFF, the alarm will be given and can be shut off only by manual actuation of the device at the rear of the bus.

The system of U.S. Pat. No. 5,874,891 allows the driver to deactivate the alarm system with the engine still running (ignition switch in ON) by walking to the rear of the bus and then manually actuating the device at the rear. While that is alleged to be a convenience to the driver, U.S. Pat. No. 5,128,651 seems to consider that possibility undesirable because it would allow any pupil, either on the pupil's own initiative or on instruction from the driver, to deactivate the system by manually operating the device at the rear while the driver remains driving the bus.

SUMMARY OF THE INVENTION

The present invention relates to a system and method for alerting responsible personnel to perform a post-trip inspection check for passengers remaining on the bus at the end of a trip. The invention requires that the ignition switch be in the ACCESSORY position in order for the system, once armed, to be rendered capable of being disarmed by actuation of a disarming device at the rear of the bus. Because a key-operated ignition switch can be operated only by a key, the invention minimizes the risk that the disarming device at the rear can disarm the system in the absence of a responsible person like the bus driver being present.

A preferred embodiment of the invention enables the disarming device to disarm the system when the ignition switch is in ACCESSORY position, and that is considered especially desirable because it enables disarming after the bus has been parked and the motor turned off, but still requires presence of a responsible person who has the ignition key, like the bus driver.

Accordingly, one general aspect of the invention relates to a bus comprising a motor that propels the bus and that is turned on and off by an ignition switch that is selectively operable to at least OFF, IGNITION, and ACCESSORY positions and a bus body comprising an interior and an exterior.

A driver's seat is at one side of the interior at a front of the body, and an entrance/exit door is at the other side opposite the driver's seat for allowing passengers to board and exit when open.

An aisle runs rearward from the front, and passenger seats are adjacent the aisle.

An electrical system of the bus comprises: signaling devices on the exterior of the bus body that, when activated, signal that the bus is stopping to allow passengers to enter or exit; one or more alert devices for giving alerts within and immediately surrounding the bus; and an electrical system controller (ESC) that processes data from various sources to provide output data for performing certain functions incidental to operation of the bus via various virtual controllers in the ESC.

One virtual controller controls the alert devices by processing data indicating status of the entrance/exit door, data indicating status of the signaling devices, data indicating status of the ignition switch, and data indicating status of a disarming device disposed proximate a rearmost passenger seat.

The one virtual controller: is set from an UNARMED state to an ARMED state upon processing data disclosing concurrence of the ignition switch being in IGNITION position, the door being open, and the signaling devices being active; is set from the ARMED state to a TRIGGERED state upon processing data disclosing concurrence of the ignition switch being in OFF position and the signaling devices not being active; is set from the TRIGGERED state to a SNOOZE state upon processing data disclosing concurrence of the ignition switch being in the ACCESSORY or IGNITION position and a snooze switch being pressed; and is rendered capable of being reset from TRIGGERED and SNOOZE states to the UNARMED state upon processing data disclosing concurrence of operation of the disarming device and of the ignition switch being in the ACCESSORY position.

A more specific aspect is that the one virtual controller, is rendered capable of being reset from TRIGGERED and SNOOZE states to the UNARMED state upon processing data disclosing concurrence of operation of the disarming device and of the ignition switch being in ACCESSORY position, and is actually reset to the UNARMED state when the processing of data discloses concurrence of operation of the disarming device, of the ignition switch being in ACCESSORY position, and of a park brake of the bus being applied.

Another general aspect of the invention relates to a method for alerting responsible personnel to perform a post-trip inspection check for passengers remaining on the bus at the end of a trip.

Still another aspect relates to how operation of the disarming device is indicated to the one virtual controller. Specifically, operation is indicated by a correct operational sequence of non-actuated, then actuated, and then non-actuated.

Still another aspect relates to a snooze feature that allows the driver to silence an alert that is given during a trip due to the motor being temporarily shut off before the trip is resumed. Silencing the alert in this way does not defeat the system because if the bus does not resume the trip within a predetermined amount of time, the system reverts to TRIGGERED state. Resuming the trip before reversion to TRIGGERED state prevents expiration of a snooze timer would otherwise resets the system to TRIGGERED state upon expiring.

The foregoing, along with further aspects, features, and advantages of the invention, will be seen in the following disclosure of a presently preferred embodiment of the invention depicting the best mode contemplated at this time for carrying out the invention. The disclosure includes drawings, briefly described as follows.

BRIEF DESCRIPTION OF THE DRAWINGS

FIG. 1 is a general schematic diagram of portions of a school bus electrical system relevant to principles of the present invention.

FIG. 1A is a top plan view of the layout of a typical school bus.

DESCRIPTION OF THE PREFERRED EMBODIMENT

Figure 2:
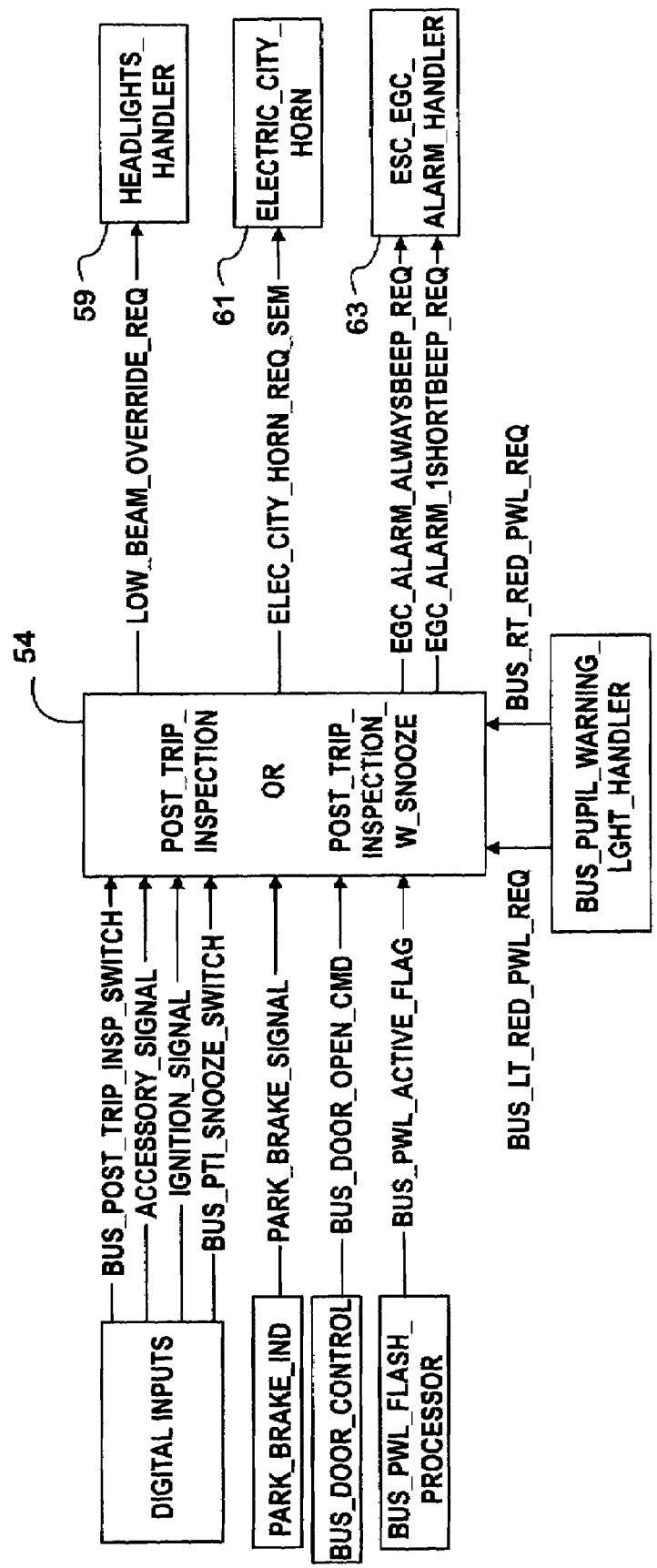
FIG. 2 is a general schematic diagram of the inventive post-trip inspection alert system including a virtual controller that receives input data, processes data, and issues output data.

FIG. 1A shows a school bus 10 comprising a body 12 mounted on a chassis that comprises a motor 14 for propelling the bus. On its interior, body 12 has a driver's seat 16 at the left front and an entrance/exit door 18 (shown open) at the right front opposite seat 16. A steering wheel 20 and instrument cluster 22 are in front of seat 16.

Bus 10 comprises an electrical system 23 that may comprise separate body and chassis system controllers that can communicate with each other, or alternatively a single system controller. For purposes of the present disclosure, bus 10 is considered to have a body electrical system controller (ESC) 24 (see FIG. 1) that exercises control over certain equipment of body 12 that includes a city horn 26, headlamps 28, 30, a cluster alarm 32, pupil warning lamps 34, 36, and deployable stop signs 38, 40 (shown deployed).

FIG. 1A further shows body 12 to have a center aisle 42 running rearward from the front of the body and rows of passenger seats 44 adjacent either side of aisle 42. Body 12 also comprises a rear emergency exit door 45 at the rear end of aisle 42.

FIG. 1 shows various inputs to ESC 24 that include a disarm input 46, an ignition switch 47, a park brake input 48, a pupil warning input 50, a door open input 52, and a snooze input 53.

Figure 3:
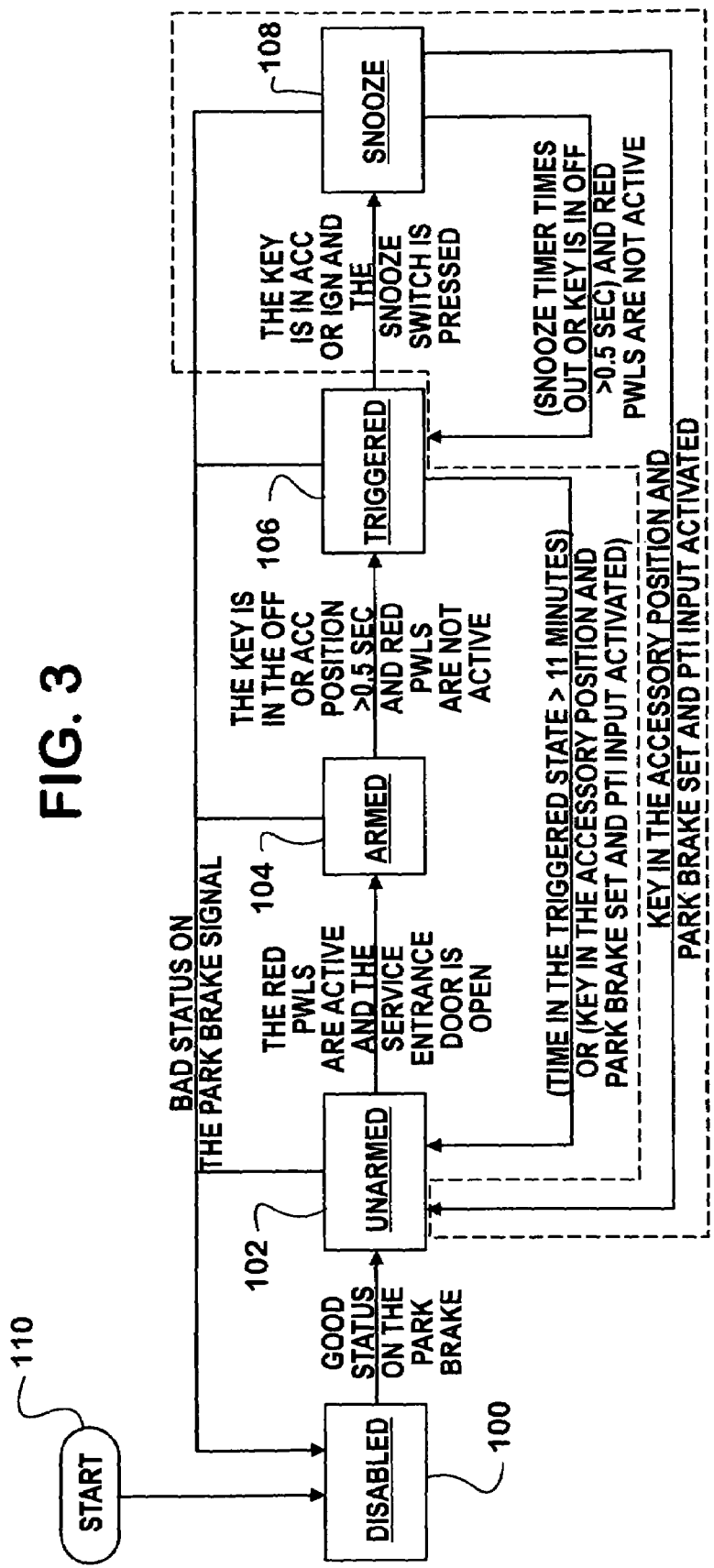
FIG. 3 is a diagram showing various operational states for the inventive post-trip inspection alert system.

General principles of the invention can be understood by considering FIGS. 2 and 3 in light of the following description.

The programming of ESC 24 with an algorithm according to the present invention creates a unique virtual controller 54 shown in FIG. 2.

Various input data processed by a processor of ESC 24 during iterations of the algorithm may be considered as inputs to virtual controller 54. The various input data shown in FIG. 2 are designated:

BUS_Post_Trip_Insp_Switch,
Accessory_Signal,
Ignition_Signal,
BUS_PTI_Snooze_Switch
Park_Brake_Signal,
BUS_Door_Open_Cmd,
BUS_PWL_Active_Flag,
BUS_LT_RED_PWL_Req, and
BUS_RT_RED_PWL_Req.

Various output data that result from processing performed by the processor during iterations of that algorithm may be considered as outputs of virtual controller 54. The various output data shown in FIG. 2 are designated:

Low_Beam_Override_Req,
Elec_City_HommReq_Sem,
EGC_Alarm_AlwaysBeep_Req, and
EGC_Alarm_1ShortBeep_Req.

Ignition switch 47 functions to turn motor 14 on and off and is disposed in or near cluster 22. A key is required to operate ignition switch 47 selectively to ACCESSORY, OFF, IGNITION, and CRANK positions. The IGNITION position may sometimes be referred to as ON position. The key is typically inserted into the switch when the switch is in OFF position. Turning the inserted key counterclockwise from OFF position places the switch in ACCESSORY position. Turning the inserted key clockwise from OFF position places the switch first in IGNITION, or ON, position. Turning the key still farther clockwise against a return spring places the switch in CRANK position for cranking motor 14 at starting. Typically the key can be physically removed from the switch only in OFF position.

The data input Ignition_Signal and Accessory_Signal are derived from ignition switch 47. Ignition_Signal, when true, indicates to virtual controller 54 that ignition switch 47 is in either IGNITION or CRANK position. The data input Accessory_Signal, when true, indicates to virtual controller 54 that ignition switch 47 is in either ACCESSORY or IGNITION position.

When ignition switch 47 is in either OFF or ACCESSORY position, motor 14 is off. When ignition switch 47 is in IGNITION position, the motor 14 is either running after having been cranked and started, or is enabled to run if cranked. When ignition switch 47 is in IGNITION position, both Ignition_Signal and Accessory_Signal are true, but when ignition switch 47 is in ACCESSORY position, only Accessory_Signal is true. When ignition switch 47 is in OFF position, neither Ignition_Signal nor Accessory_Signal is true. By processing both Ignition_Signal and Accessory_Signal, virtual controller 54 can distinguish each of the three positions, ACCESSORY, OFF, and IGNITION.

BUS_Post_Trip_Insp_Switch is an element of the disarm input 46. When a disarming device at the rear of the bus, such as an existing switch 45S associated with a lever that can be selectively positioned to bar and unbar rear door 45, or alternatively a devoted switch near the rear door, operates from a non-actuated state to an actuated state, BUS_Post_Trip_Insp_Switch operates from false to true. Depending on the specific switch, the switch may be a normally open switch that is closed when actuated, or a normally closed switch that is open when actuated. The switch is typically spring-biased. Again depending on the particular switch, actuation may occur by depressing the switch actuator against the spring-bias or by releasing the switch actuator to allow the spring-bias to operate the switch from non-actuated to actuated. BUS_Post_Trip_Insp_Switch corresponds to disarm input 46.

Park_Brake_Signal is derived from a source named Park_Brake_Ind 48 and is true when a park brake of the bus is being applied. The park brake is typically applied after the bus has been parked at the end of a trip. Park_Brake_Signal and Park_Brake_Ind correspond to park brake input 48.

BUS_Door_Open_Cmd is derived from a source BUS_Door_Control 52 and is true when the bus driver is requesting that door 18 be open. This is one of alternate ways to signal door opening. Another way would be by using a door switch at the door to signal door open and door closed. BUS_Door_Control and BUS_Door_Open_Cmd correspond to Door Open Input 50.

BUS_PWL_Active_Flag is derived from a source designated BUS_PWL_Flash_Processor. It is true when the a pupil warning is being given. In the particular embodiment shown in FIG. 1A, pupil warning is given by the flashing of lights 34, 36 and the deployment of stop signs 38, 40.

BUS_LT_RED_PWL_Req and BUS_RT_RED_PWL_Req are derived from a source designated Bus_Pupil_Warning_Lght_Handler and are true when the driver is requesting pupil warning either by actuation of a devoted switch or by some other action.

In case certain lamps used for signaling pupil warning may flash at times other than for pupil warning, the processing of BUS_PWL_Active_Flag assures that flashing of the lights is due to pupil warning and not some other function. Collectively, BUS_LT_RED_PWL_Req, BUS_RT_RED_PWL_Req, and BUS_PWL_Active_Flag correspond to pupil warning input 50.

BUS_PTI_Snooze_Switch is derived from a snooze pushbutton switch 57 located in or near cluster 22 and corresponds to snooze input 53 in FIG. 1. BUS_PTI_Snooze_Switch is true when switch 57 is being actuated, i.e. switch actuator being pressed.

Low_Beam_Override_Req is effective through a headlights handler 59, and when true, is requesting headlamps 28, 30 to operate at low beams.

Elec_City_HommReq_Sem is effective through a horn handler 61, and when true, requests horn 26 to sound.

EGC_Alarm_AlwaysBeep_Req is effective through an alarm handler 63, and when true, requests cluster alarm 32 to continually sound, i.e. continually beep.

EGC_Alarm_1ShortBeep_Req is effective through handler 63, and when true, requests cluster alarm 32 to sound once for a short time and then stop, i.e. beep once.

FIG. 3 shows a succession of operational states of the inventive post-trip inspection alert system beginning with a DISABLED state 100 followed in succession by an UNARMED state 102, an ARMED state 104, and a TRIGGERED state 106. When snooze switch 57 is actuated while the system is in the TRIGGERED state, the system switches to a SNOOZE state 108.

The system transitions from one state to another depending on the status of various input signals to virtual controller 54. Virtual controller 54 is created by an algorithm that is programmed in the processor of ESC 24, hence the adjective "virtual". Once the algorithm is first enabled, such as when the ignition switch is turned to a position other than OFF, the algorithm begins its first iteration at a start point 110 with the presumption that the system is in DISABLED state 100. If the status of the park brake is good, the system state advances to the UNARMED state 102. Presuming that the bus will be embarking on a passenger-transporting trip, the system will remain in UNARMED state 102 until such time as virtual controller 54 detects that passengers are being transported. Transportation of passengers is indicated to virtual controller 54 by concurrence of a pupil warning provided by pupil warning input 50 and opening of entrance/exit door 18 provided by door open input 52, whereupon the system state advances from UNARMED state 102 to ARMED state 104.

The system remains in ARMED state 104 until such time as motor 14 is turned off and any pupil warning has ceased. Typically that will occur at the end of a passenger trip after all passengers have de-boarded. At that time the system is set from ARMED state 104 to TRIGGERED state 106 by virtual controller 54 processing data disclosing concurrence of motor 14 being turned off provided by ignition switch 47 and the pupil warning devices not being active.

Upon entering TRIGGERED state 106, virtual controller 54 starts a timing function and also issues a low-level alert intended to remind the bus driver to check the bus for any pupils who for whatever reason may still be in the bus. The low-level alert comprises cluster alarm 32 beeping continually and headlamps 28 and 30 flashing low beams. The timing function allows the bus driver an appropriate amount of time, approximately one minute for example, to walk along aisle 42 to the rear of the bus and actuate switch 45S.

Upon processing data disclosing that switch 45S has not been actuated within the allotted one minute time after the onset of TRIGGERED state 106, virtual controller 54 then causes one or more alert devices to give a high-level alert. A high-level alert is more prominent than the low-level alert and is intended to cover a larger area, not only inside the bus, but in the immediate vicinity surrounding the bus, to alert others who may be present in the vicinity besides the driver that the bus has not been checked to assure that all pupils are off the bus. The high-level alert comprises not only continued flashing of the headlamps, but further includes honking horn 26. For example, a high-level alert may be given for up to ten minutes more after the one-minute low-level alert.

The system is capable of being placed in SNOOZE state 108 from TRIGGERED state 106 upon virtual controller 54 processing data disclosing concurrence of actuation of snooze switch 57 and of ignition switch 47 being in either ACCESSORY or IGNITION position.

The system is capable of being reset from both TRIGGERED state 106 and SNOOZE state 108 to UNARMED state 102 upon virtual controller 54 processing data disclosing concurrence of actuation of disarming switch 45S and of ignition switch 47 being in ACCESSORY position. However, according to the disclosed preferred embodiment of the invention, actual resetting to UNARMED state 102 is also conditioned on the park brake also being set. By requiring that ignition switch 47 be in ACCESSORY position, it is assured that motor 14 has not been re-started after having been shut off, and that a key is present in the ignition switch. Consequently, the system cannot be disarmed by merely actuating the disarming device, i.e. switch 45S. The ignition switch must also be turned to ACCESSORY position at the time that the disarming device is actuated, and in the disclosed embodiment the still further condition that the park brake be set must also be satisfied.

If the system remains in TRIGGERED state 106 for a certain amount of time without the disarming device being operated, the timing function, which continues after time allotted to the TRIGGERED state (i.e. one minute low-level alert, ten minutes high-level alert), will eventually shut off the alert devices that are giving the high-level alert so as not to drain the bus batteries.

In case the parking brake is indicated as possibly faulty, by a "bad status" for example, the system is placed in DISABLED state 100. A 'bad status' input to virtual controller 54 is depicted as a fault in the park brake module. The fault can range from a sensor input error to a brake system failure.

Figure 4:
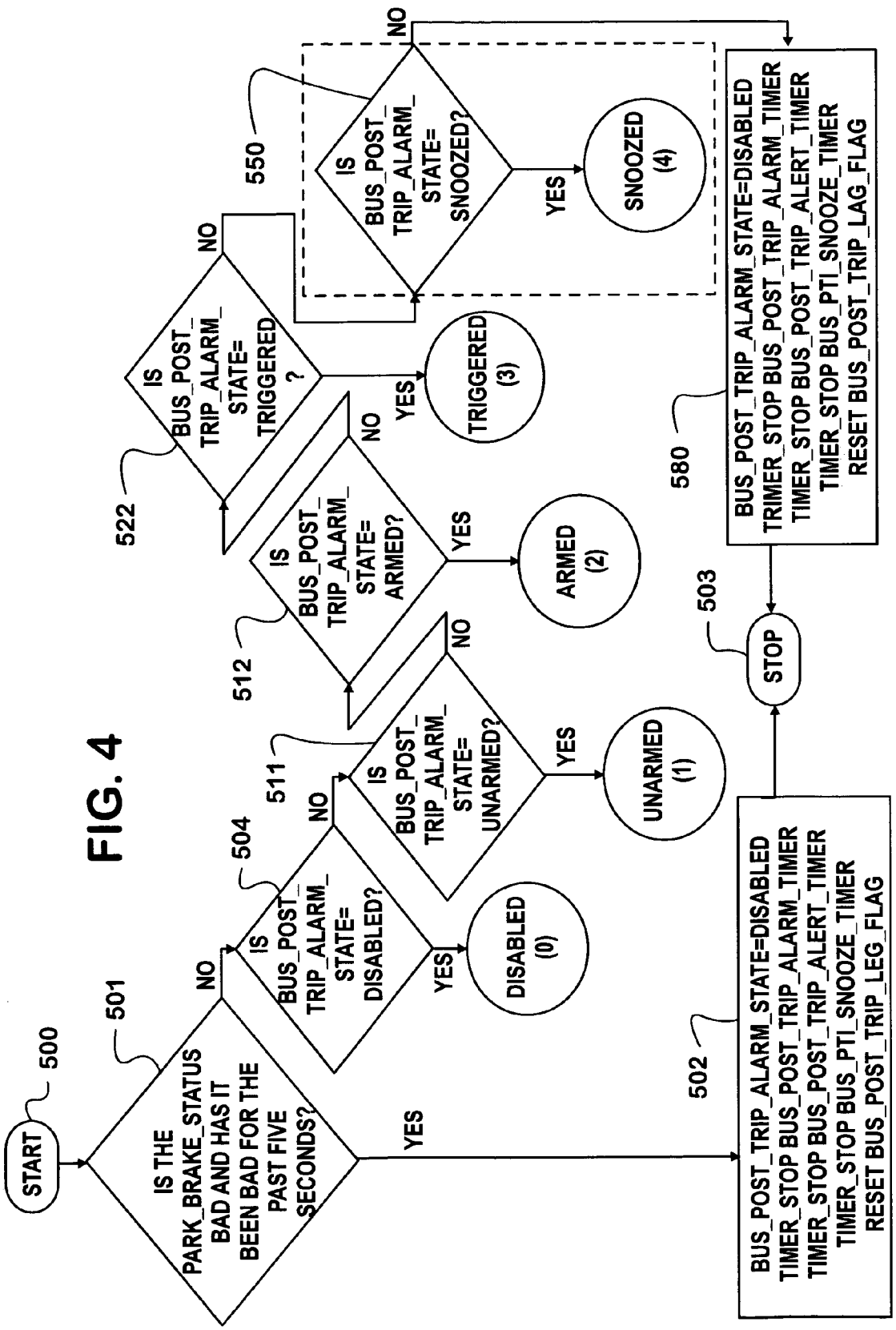
FIG. 4 is a general software strategy diagram for use in describing an implementation of an algorithm in the virtual controller for selectively placing the inventive post-trip inspection alert system in the various operational states.

FIG. 4 depicts steps of the algorithm that creates virtual controller 54.

Various parameters are instrumental in execution of the algorithm. Parameters already mentioned include: BUS_Post_Trip_Insp_Switch, Accessory_Signal, Ignition_Signal, BUS_PTI_Snooze_Switch, Park_Brake_Signal, BUS_Door_Open_Cmd, BUS_PWL_Active_Flag, BUS_LT_Red_PWL_Req, and BUS_RT_Red_PWL_Req. Further parameters include: BUS_PTI_Ignition_Off_Delay_Timer, BUS_Post_Trip_Alarm_Timer, BUS_Post_Trip_Alert_Timer, and BUS_PTI_Snooze_Timer which provide respective timing functions that will be eventually explained. BUS_Post_Trip_Lag_Flag, BUS_Post_Trip_Timer_Flag, BUS_Post_Trip_Button_Pushed_Flag, and BUS_Post_Trip_Alert_Flag are respective flags that can be set and reset. The purposes of the various flags will also be eventually explained. Bus_Post_Trip_Alarm_State indicates one of the possible system states: DISABLED, UNARMED, ARMED, TRIGGERED, and SNOOZE.

The algorithm repeatedly iterates at an appropriate frequency which may be constant or variable depending on processing priorities. After its start 500, the algorithm executes a first step 501 that determines the park brake status. If the status is "bad", meaning consistently bad for the past five seconds for example, the system will not operate except to remain in DISABLED state 100 as indicated at step 502. The Post Trip Alarm, Post Trip Alert, and PTI Snooze timing functions are stopped, and the Bus Post Trip Lag Flag is reset. Thereupon execution of the algorithm stops (step 503) until the next iteration is requested.

Whenever a subsequent execution of the algorithm discloses that park brake status is not "bad", a step 504 determines the state of the system, which is still DISABLED state 100 as indicated by Bus_Post_Trip_Alarm_State. Consequently, the algorithm executes according to steps shown FIG. 5.

Figure 5:
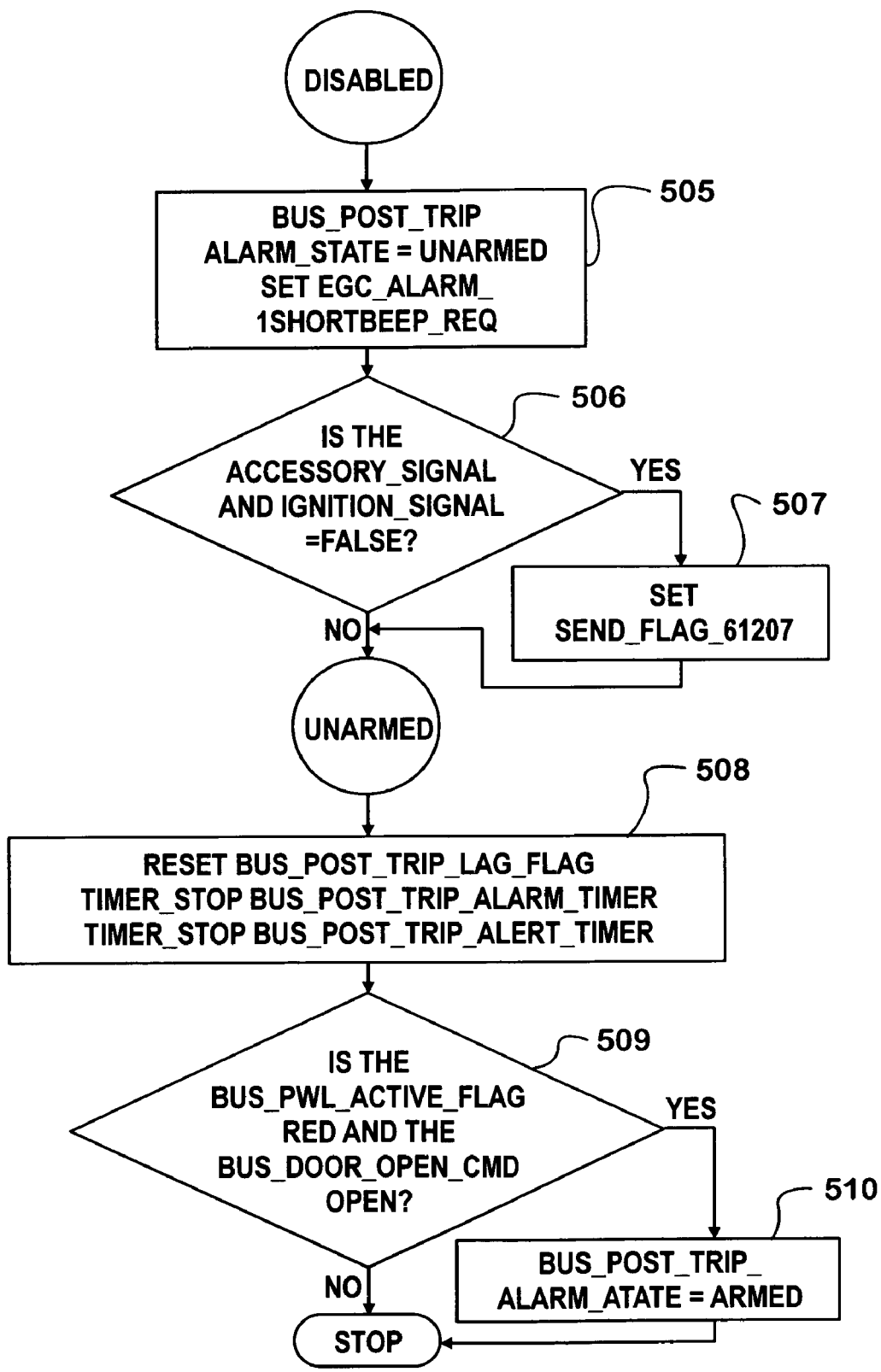
FIG. 5 is a more detailed software strategy diagram that that describes a DISABLED state of the algorithm and an UNARMED state of the algorithm.

FIG. 5 shows that during a step 505, BUS_Post_Trip_Alarm_State is set to UNARMED state 102, and EGC_Alarm__1ShortBeep_Req is set true causing cluster alarm 32 to give one short beep that is intended to inform the driver that the system is now UNARMED.

A subsequent step 506 checks the status of ignition switch 47. If Accessory_Signal and Ignition_Signal are both false, ignition switch 47 is indicated in OFF position, resulting in a step 507 that sets Send_Flag__61207. The purpose of Send_Flag__61207 will be eventually explained. Thereafter the algorithm continues in UNARMED state 102 to a step 508.

When step 506 discloses that ignition switch 47 is not in OFF position, the system remains in UNARMED state 102 and the algorithm continues directly with step 508, the difference being that step 507 is omitted so that Send_Flag__61207 is not set.

Step 508 stops two timing functions BUS_Post_Trip_Alarm_Timer, and BUS_Post_Trip_Alert_Timer (meaning the timing functions stop counting down), and resets the BUS_Post_Trip_Lag_Flag.

A step 509 determines the status of door 18 and the pupil warning signal and causes the system to remain in UNARMED state 102 as long as door 18 is not open at the same time as a pupil warning is being given, and as long as a pupil warning is not being given at the same time that the door is open. If the door is not open and the pupil warning is not being given, then that iteration of the algorithm stops.

When the algorithm next iterates, it repeats steps 501 and 504, but after step 504 executes a step 511 to determine if the system is in UNARMED state 102. As long as UNARMED state 102 continues, steps 508 and 509 follow step 511 and the algorithm then stops until the next iteration.

Whenever step 509 determines that door 18 is open while pupil warning is being given, a step 510 is performed setting BUS_Post_Trip_Alarm_State to ARMED state 104. When the algorithm next iterates, step 511 will be followed by a further step 512. With the system now in ARMED state 104, the sequence of steps shown in FIG. 6 is performed.

Figure 6:
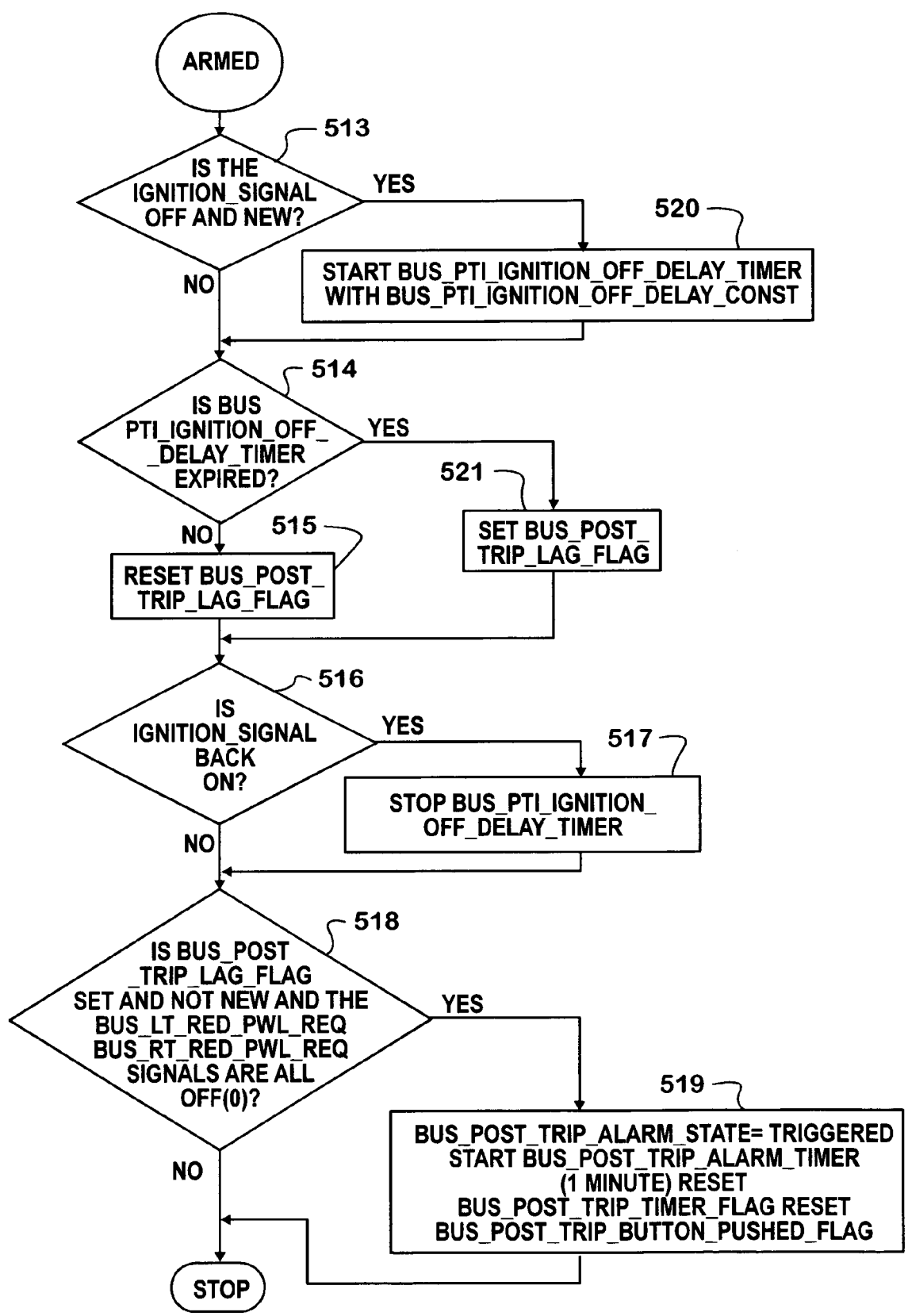
FIG. 6 is a more detailed software strategy diagram that describes an ARMED state of the algorithm.

A first step 513 in FIG. 6 determines the status of ignition switch 47 to ascertain if it is still in IGNITION position or if it has been operated out of IGNITION position. As long as ignition switch 47 is still in IGNITION position, a subsequent step 514 determines if BUS_PTI_Ignition_Off Delay_Timer has expired, meaning having timed out. As long as that timer has not expired, BUS_Post_Trip_Lag_Flag is reset (step 515). A step 516 then determines if the Ignition_Signal is "back on", meaning simply is the switch in IGNITION position.

If ignition switch 47 is in IGNITION position, a step 517 stops BUS_PTI_Ignition_Off_Delay_Timer. A subsequent step 518 determines if BUS_Post_Trip_Lag_Flag is set and not new (meaning not newly set during this iteration of the algorithm) and if the pupil warning is not being given. If either the flag is not set or pupil warning is being given, the algorithm stops to await the next iteration. Should both the flag be set and not new and pupil warning not be also given, a step 519 sets BUS_Post_Trip_Alarm_State to TRIGGERED, starts BUS_Post_Trip_Alarm_Timer, resets BUS_Post_Trip_Timer_Flag, and resets BUS_Post_Trip_Button_Pushed_Flag, after which this iteration of the algorithm stops.

Had step 513 disclosed that the Ignition_Signal was off and new, the algorithm would have performed a step 520 before the algorithm advanced to step 514. Step 520 comprises starting BUS_PTI_Ignition_Off_Delay_Timer. The delay is defined by a parameter BUS_PTI_Ignition_Off Delay_Const, and in the embodiment shown the length of the delay is 0.5 second.

Had step 514 disclosed that the BUS_PTI_Ignition_Off_Delay_Timer had expired, it would have set BUS_Post_Trip_Lag_Flag at a step 521 before the algorithm advanced to step 516.

The purpose of BUS_PTI_Ignition_Off_Delay_Timer can now be explained. As the algorithm executes, some of the data that it processes each time that it executes is obtained from "snapshots". In electrical and electronic systems, data taken by one snapshot may not be the true data for any one or more of various reasons, such as electrical noise, a momentary random event such as an interrupt, etc. In the case of ignition switch 47, the act of turning the switch from IGNITION position to OFF or ACCESSORY position will result in Ignition_Signal changing from true (i.e., on) to false (i.e., off). In order to assure that the switch has in fact been operated from IGNITION, the BUS_PTI_Ignition_Off_Delay_Timer is started by step 520 when step 513 first discloses that Ignition_Signal has changed from true to false. BUS_PTI_Ignition_Off_Delay_Const is a programmable parameter that sets the amount of time to be timed, 0.5 seconds as mentioned.

The algorithm runs sufficiently fast that the first execution of step 514 after the timer has started will disclose that the time has not expired. This results in step 515 resetting BUS_Post_Trip_Lag_Flag. As long as Ignition_Signal remains false while BUS_PTI_Ignition_Off_Delay_Timer is timing the 0.5 second delay, step 513 will by-pass step 520 and proceed directly to step 514. If Ignition_Signal has remained false for the 0.5 second delay, the next time that step 514 is performed, that step will be followed by step 521 that then sets BUS_Post_Trip_Lag_Flag. Should a momentary event cause Ignition_Signal to indicate true as BUS_PTI_Ignition_Off Delay_Timer is timing, then step 517 will stop the timer from counting down to prevent it from expiring. The setting of BUS_Post_Trip_Lag_Flag is used as the indicator that ignition switch 47 is not in IGNITION position. One of the conditions of step 518 however is that BUS_Post_Trip_Lag_Flag be set, but not newly set, meaning not newly set during the current iteration. Hence at the first setting of BUS_Post_Trip_Lag_Flag, step 519 will not be performed after step 518, and the algorithm will iterate beginning at start 500. As long as Ignition_Signal has remained false, the next time that step 518 occurs, BUS_Post_Trip_Lag_Flag will still be set and not newly set. If BUS_LT_Red_PWL_Req and BUS_LT_Red_PWL_Req are also both false, step 519 will follow. Otherwise the algorithm will continue to iterate until they are.

BUS_Post_Trip_Lag_Hag serves to cause at least one additional iteration after the first determination that the ignition switch has actually been turned to OFF or ACCESSORY position. The purpose of the additional iteration is to assure that the latest pupil warning light request data, which is processed later in the loop, is taken into account.

Figure 7A:
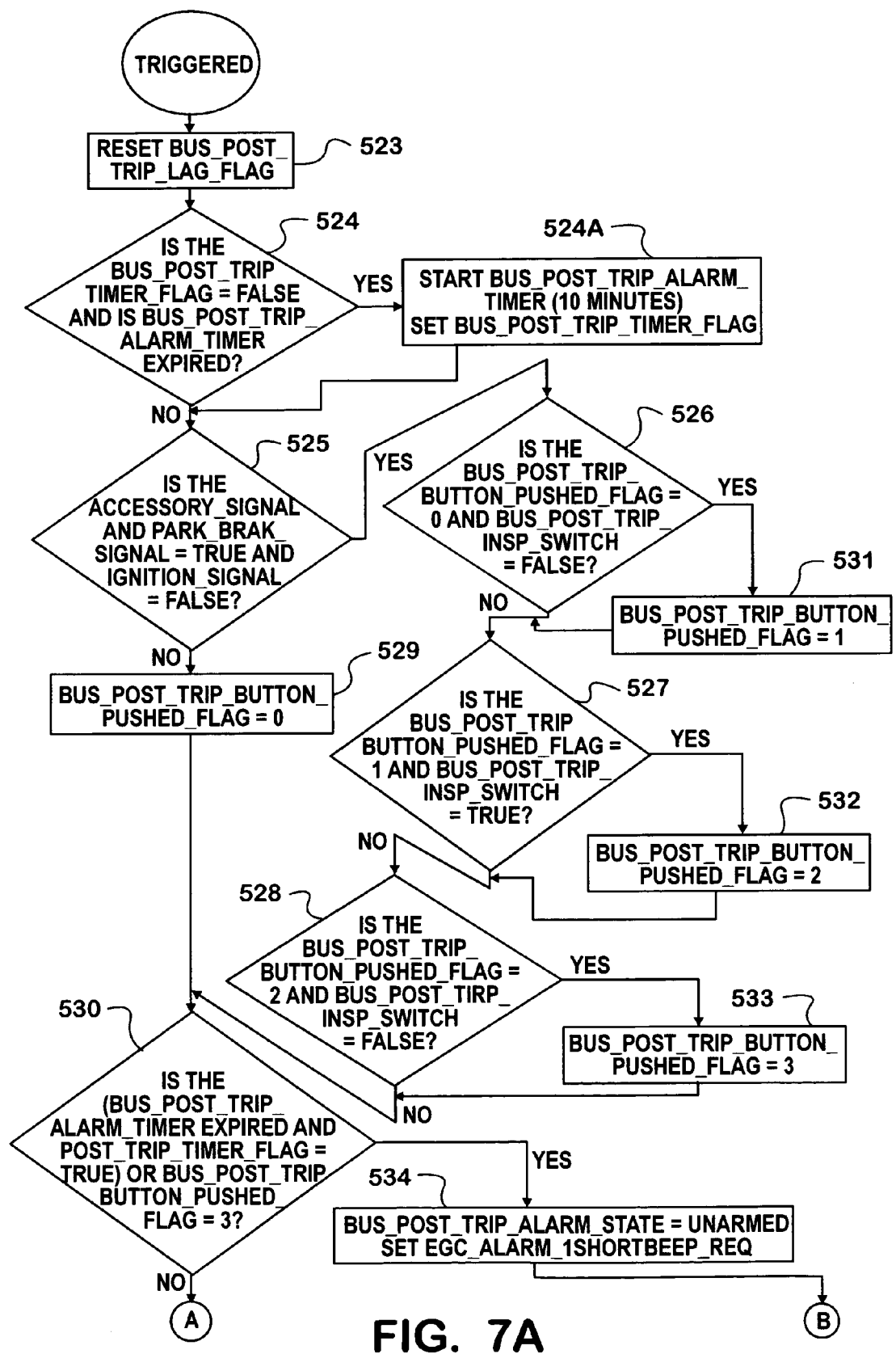
FIGS. 7A and 7B together are a more detailed software strategy diagram that describes a TRIGGERED state of the algorithm.

When execution of the steps of FIG. 6 results in the system state being set to TRIGGERED state 106, step 519 is followed by the next iteration of the algorithm beginning at start 500, and assuming that step 501 continues to disclose park brake status as good, proceeding through steps 504, 511, and 512 after which a step 522 is performed. Step 522 will disclose that the system has been set to TRIGGERED state 106, and that results in the algorithm proceeding to perform the sequence of steps shown in FIGS. 7A and 7B.

An initial step 523 resets BUS_Post_Trip_Lag_Flag to ensure an additional iteration. A following step 524 checks the status of BUS_Post_Trip_Timer_Flag and BUS_Post_Trip_Alarm_Timer. If either BUS_Post_Trip_Timer_Flag is not false or BUS_Post_Trip_Alarm_Timer has not expired, a step 525 is performed next. However, if both BUS_Post_Trip_Timer_Flag is false and BUS_Post_Trip_Alarm_Timer has has expired, a step 524A is performed before step 525. Step 524A starts BUS_Post_Trip_Alarm_Timer and sets BUS_Post_Trip_Timer_Flag.

Step 525 determines the status of both ignition switch 47 and the park brake switch. If both the ignition switch is in ACCESSORY position and the park brake is being applied, the algorithm determines the status of the disarming switch 45S at the rear of the bus via a sequence of steps 526, 527, and 528. If either the ignition switch is not in ACCESSORY position or the park brake is not being applied, the algorithm sets the value of BUS_Post_Trip_Button_Pushed_Flag to 0. After either step 528 or step 529, the algorithm performs a step 530.

The status of disarming switch 45S is indicated by BUS_Post_Trip_Button_Pushed_Flag that can have any one of four unique values, 0, 1, 2, or 3.

BUS_Post_Trip_Button_Pushed_Flag is assigned the value 0 by the algorithm before the algorithm reaches step 525. Step 526 checks the switch status to assure that BUS_Post_Trip_Button_Pushed_Flag has been reset to 0 and to assure that the disarming switch is not being actuated, i.e. is off, i.e. false. This corresponds to the rear door lever being in position barring the rear door from opening.

When step 526 confirms that BUS_Post_Trip_Button_Pushed_Flag has been set to 0 and that disarming switch 45S is off, step 531 sets BUS_Post_Trip_Button_Pushed_Flag to the value 1.

So long as disarming switch 45S remains non-actuated, i.e. off, during ensuing iterations of the algorithm, the value of BUS_Post_Trip_Button_Pushed_Flag remains 1, and the algorithm will proceed through steps 527 and 528 without changing that value.

Whenever actuation of the disarming switch is first detected, step 527 will be followed by a step 532 before step 528 is performed. Step 532 advances the value of BUS_Post_Trip_Button_Pushed_Flag to 2, after which the algorithm proceeds to step 528. If actuation of the disarming switch has ceased by the time step 528 executes, that step will cause a step 533 to be performed before step 530. Step 533 advances the value of BUS_Post_Trip_Button_Pushed_Flag to 3.

The purpose of the sequence of requiring BUS_Post_Trip_Button_Pushed to advance through values 0 through 3 in succession is to provide the maximum assurance that the disarming switch has actually been actuated and returned to its pre-actuation condition. The sequence checks the detailed sequence of switch conditions that occur when the switch is initially non-actuated, then actuated, and returned to non-actuated.

Step 530 checks the status of the BUS_Post_Trip_Alarm_Timer, the Post_Trip_Timer_Flag, and the BUS_Post_Trip_Button_Pushed_Flag.

Figure 7B:
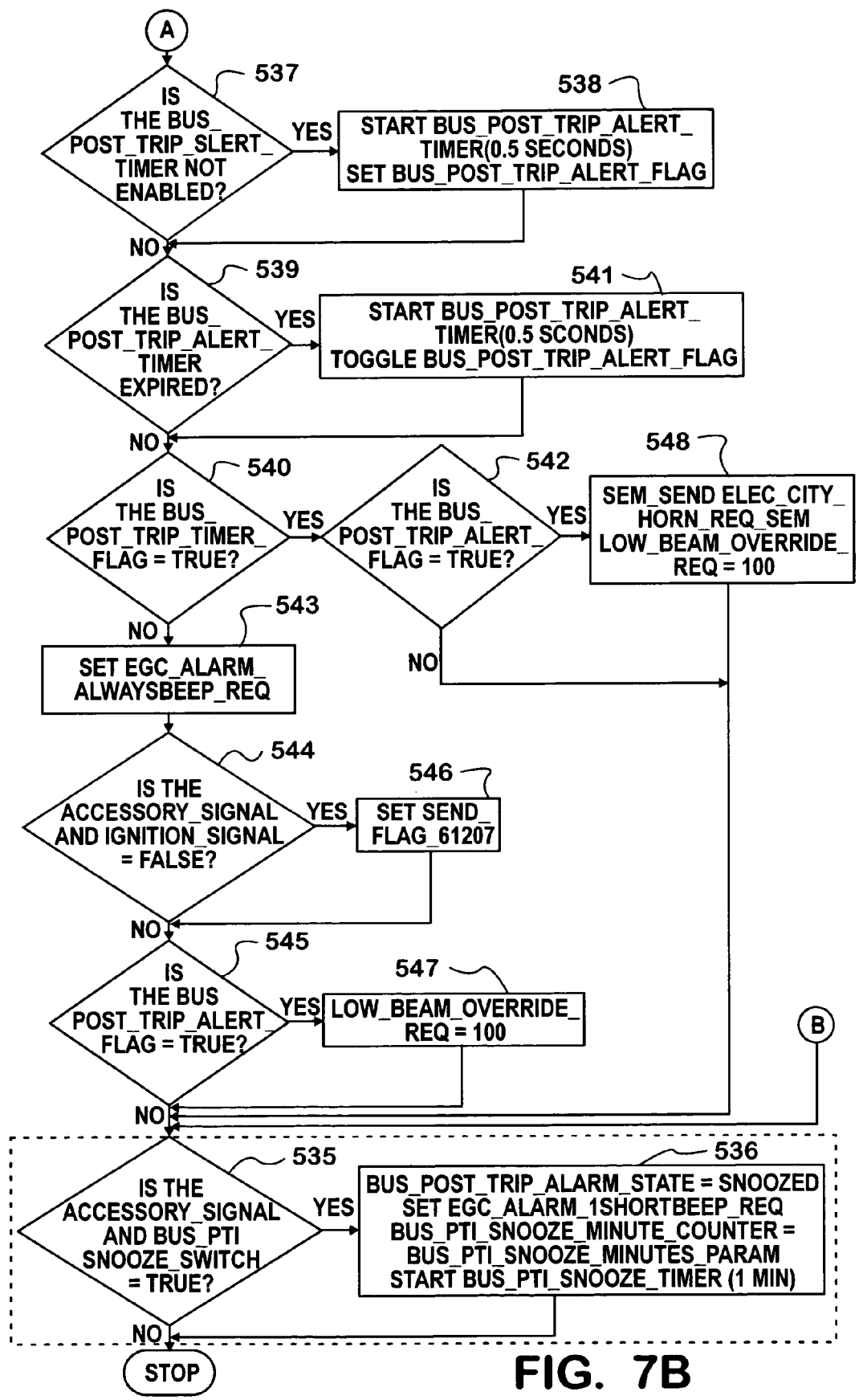

If disarming switch 45S has not been actuated and released within the time allotted by the alarm timer, the algorithm will proceed to a first entry point A in the sequence of steps shown in FIG. 7B. On the other hand, if the disarming switch has been actuated and returned to non-actuated condition within the time allotted by the alarm timer, the algorithm will proceed to a step 534 still in FIG. 7A that sets BUS_Post_Trip_Alarm_State to UNARMED and causes the cluster alarm 32 to give one short beep to announce UNARMED state 104.

After step 534, the algorithm proceeds to a second entry point B in FIG. 7B. That second entry point is at a step 535 that checks the status of ignition switch 47 and snooze switch 57. The current iteration of the algorithm will stop unless the ignition switch is in ACCESSORY or IGNITION position and the snooze switch has been pressed, in which case a step 536 would be performed before the current iteration stops. With the driver presumably at the rear of the bus when the disarming switch is operated, he or she cannot be pressing the snooze switch, in which case step 536 does not occur and the system remains in UNARMED state 104.

When the algorithm next iterates, steps 501, 504, and 511 will be performed after which step 508 resets BUS_Post_Trip_FLag_Flag and stops BUS_Post_Trip_Alarm_Timer and BUS_Post_Trip_Alert_Timer. Since the driver will not be giving the pupil warning, step 509 will no longer be able to arm the system although the driver can open the door to allow himself or herself to exit after having turned ignition switch 47 off and removed the key.

Should step 530 disclose that the BUS_Post_Trip_Button_Pushed_Flag value is not 3, then the algorithm proceeds to performs steps shown in FIG. 7B beginning with a step 537 that determines enablement of Bus_Post_Trip_Alert_Timer. If Bus_Post_Trip_Alert_Timer is not enabled, then a step 538 starts it and also sets BUS_Post_Trip_Alert_Flag.

When successive iterations of the algorithm ahead of step 537 reach step 537 for the first time, the steps immediately following step 537 will cause the low-level alarm to be given. That low level alarm will continue for one minute unless the disarming switch at the rear of the bus is operated in accordance with the sequence described earlier within that one minute time interval. After steps 537 and 538, a step 539 determines if Bus_Post_Trip_Alert_Timer has expired, and if it is determined that it has not expired, a step 540 determines if BUS_Post_Trip_Timer_Flag is true. If that flag is not true, a step 543 sets EGC_Alarm_AlwaysBeep_Req, causing cluster alarm 32 to continually sound as the algorithm continually iterates. A next step 544 determines the ignition switch status.

If ignition switch 47 is in OFF position, both Acccessory_Signal and Ignition_Signal will be false, and a step 546 will set Send_Flag__61207 before a step 545 is performed. If ignition switch 47 is in either ACCESSORY position or IGNITION position, then step 546 is omitted, and step 545 determines if BUS_Post_Trip_Alert_Flag is true. If BUS_Post_Trip_Alert_Flag is true, a step 547 issues Low_Beam_Override_Req=100 before step 535 is performed. If BUS_Post_Trip_Alert_Flag is false, step 547 is omitted. (The =100 qualifier following Low_Beam_Override_Req means that when the low beams are on, they are on at 100% intensity.)

The purpose of BUS_Post_Trip_Alert_Flag is to provide a toggle for timing the low beams of headlamps 28, 30 and city horn 26 on and off. The toggle occurs by BUS_Post_Trip_Alert_Flag being repeatedly set for 0.5 second and then reset for 0.5 second. BUS_Post_Trip_Alert_Timer times the 0.5 second time intervals.

Should step 540 disclose that BUS_Post_Trip_Timer_Flag is true, a step 542 determines if BUS_Post_Trip_Alert_Flag is true. If BUS_Post_Trip_Alert_Flag is not true, the algorithm proceeds to step 535. If it is true, a step 548 issues Elec_City_Horn_Req_Sem and Low_Beam_Override_Req=100. The _SEM qualifier following Elec_City_Horn_Req means that the horn request is conveyed via semaphore.

BUS_Post_Trip_Alert_Timer was first started by step 519 when the system state changed from ARMED state 104 to TRIGGERED state 106. As long as that BUS_Post_Trip_Alert_Timer has not expired and BUS_Post_Trip_Button_Pushed_Flag does not have the value 3, step 530 will be followed by step 537. Collectively, steps 538, 539, 540, 541, and 542 will toggle the BUS_Post_Trip_Alert_Flag. The toggling is monitored by step 545 to turn the headlamp low beams on at 100% intensity for 0.5 second and then off for 0.5 second via step 547. For the first minute of TRIGGERED state 106 step 543 will set EGC_Alarm_AlwaysBeep_Req by continually setting EGC_Alarm_AlwaysBeep_Req at each iteration of the algorithm. Cluster alarm 32 will therefore continually sound until either the request is discontinued or cluster 22 is placed in a sleep mode that discontinues operation of devices in the cluster like cluster alarm 32.

Because certain conditions may place the cluster in sleep mode before the inventive algorithm has concluded, setting Send_Flag__61207 serves to override the effect of those conditions and keep the cluster awake until the algorithm concludes.

Consequently during the first minute of TRIGGERED state 106, cluster alarm 32 will continually sound and the headlamp low beams will flash. That is the low-level warning.

After the first minute has elapsed without the system being disarmed, the high-level warning is given. The first time that step 524 is performed after the first minute in TRIGGERED state 106 has elapsed, it will determine that BUS_Post_Trip_Alarm_Timer has expired. Since BUS_Post_Trip_Timer_Flag is also false, step 524 will be followed by step 524A that restarts BUS_Post_Trip_Alarm_Timer and sets BUS_Post_Trip_Timer_Flag to true.

With BUS_Post_Trip_Timer_Flag now true, step 540 will be followed by step 542. With steps 537, 538, 539, and 541 still toggling BUS_Post_Trip_Alert_flag, step 542 in conjunction with step 548 will now not only continue to flash the headlamp low beams, but also to turn horn 26 on and off with the flashing of the headlamps. Since step 543 is no longer setting EGC_Alarm_AlwaysBeep_Req at each iteration of the algorithm, cluster alarm 32 does not sound during high-level alert.

If the system has not been disarmed within the additional ten minutes during which the high-level alert is being given, the first time that step 530 is performed after the expiration of the additional ten minutes, it will return the system to UNARMED state 102, discontinuing the alert in order to conserve battery power.

With the system in TRIGGERED state 106, actuation of snooze switch 57 places the system in SNOOZE state 108, setting BUS_Post_Trip_Alarm_State to SNOOZE. The purpose of SNOOZE state 108 is to allow the driver to interrupt TRIGGERED state 106 for a limited amount of time. When the algorithm reaches step 535 for the first time after snooze switch 57 has been actuated, i.e. set to true, the immediately following step 536 sets EGC_Alarm_1ShortBeep_Req to true, causing cluster alarm 32 to sound briefly to announce SNOOZE state 108. A BUS_PTI_Snooze_Minute_Counter is set to BUS_PTI_Snooze_Minutes_Param. BUS_PTI_Snooze_Timer is also started. BUS_PTI_Snooze_Timer counts sixty second, i.e. one minute, time intervals.

Figure 8A:
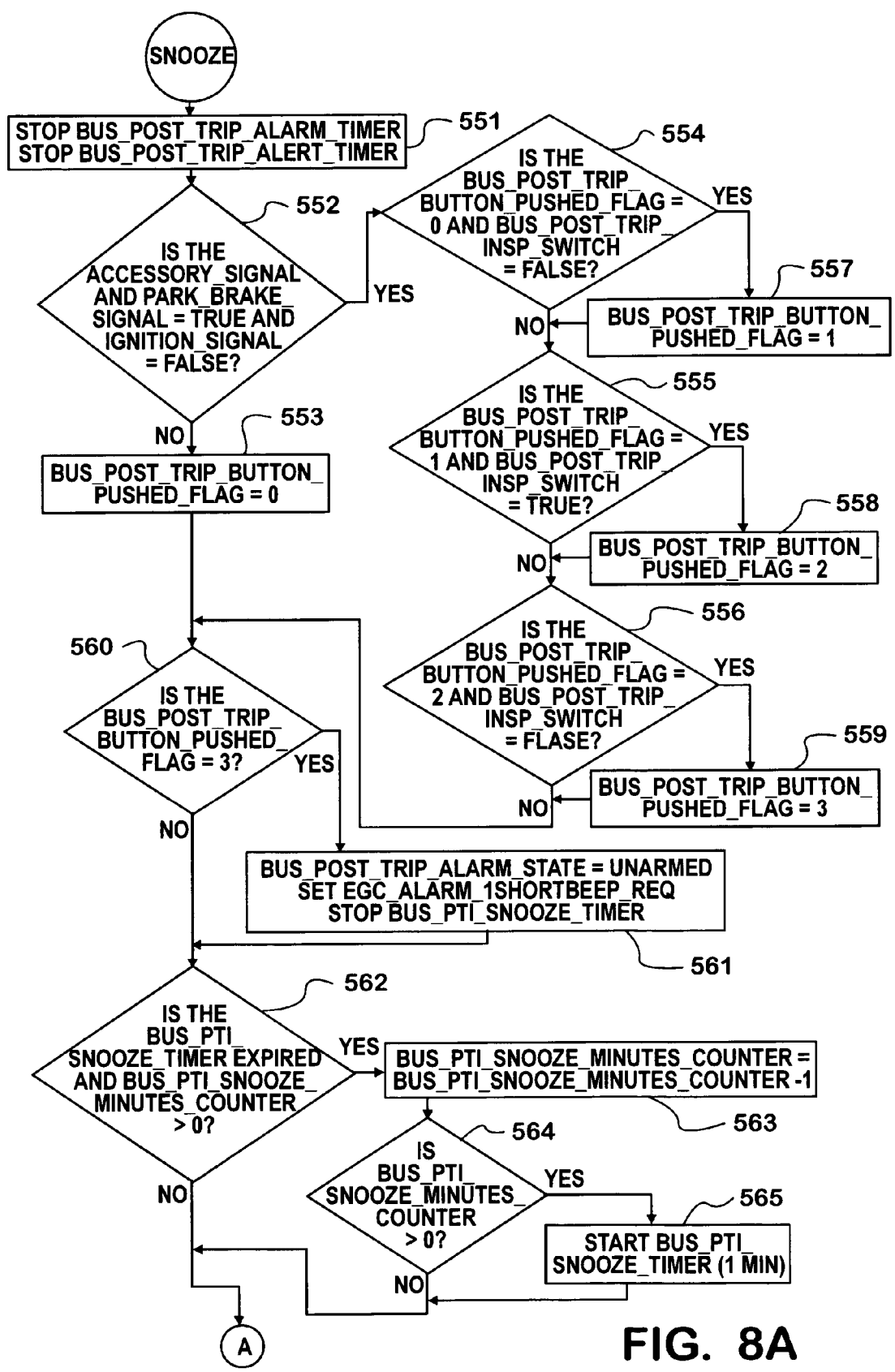
FIGS. 8A and 8B together are a more detailed software strategy diagram that describes a SNOOZE state of the algorithm.

At the next iteration of the algorithm, steps 501, 504, 511, and 522 will be performed. With step 522 now disclosing that the system is no longer in TRIGGERED state 106, a step 550 is next executed resulting in the sequence of steps shown in FIGS. 8A and 8B. A first step 551 in FIG. 8A stops, but does not reset, BUS_Post_Trip_Alarm_Timer and BUS_Post_Trip_Alert_Timer. A following step 552 determines the status of ignition switch 47.

If ignition switch 47 in step 552 is in a position other than ACCESSORY position, then a step 553 sets BUS_Post_Trip_Button_Pushed_Flag to 0. If the ignition switch is in ACCESSORY position and the park brake is being applied, then the status of disarming switch 45S is determined by steps 554, 555, 556 which will be recognized as a sequence identical to sequence 526, 527, 528 in FIG. 7A. Depending on the determination of each step 554, 555, 556, the value of BUS_Post_Trip_Button_Pushed_Flag may be advanced. Hence, the status of the disarming switch will have been determined at the time that a step 560 occurs.

Step 560 determines whether the disarming switch has been depressed and released. If it has, then a step 561 sets BUS_Post_Trip_Alarm_State to UNARMED, sets EGC_Alarm_1ShortBeep_Req to true, causing cluster alarm 32 to sound briefly to announce UNARMED state 102, and stops BUS_PTI_Snooze_Timer. This allows the disarming switch to return the system to UNARMED state 102 from SNOOZE state 108. Thereupon the algorithm performs a step 562. When step 560 determines that the disarming switch has not been depressed and released, step 561 is omitted and 562 is performed immediately after step 560.

Step 562 determines if the BUS_PTI_Snooze_Timer has expired and if the BUS_PTI_Snooze_Minutes_Counter is greater than zero. Although some positive number of minutes (determined by BUS_PTI_Snooze_Minutes_Param) is set in BUS_PTI_Snooze_Minutes_Counter at the first performance of step 536 (FIG. 7B), the first performance of step 562 will indicate that snooze time has not yet expired because the first sixty seconds of snooze time are just starting, and therefore the algorithm will execute steps in FIG. 8B.

Figure 8B:
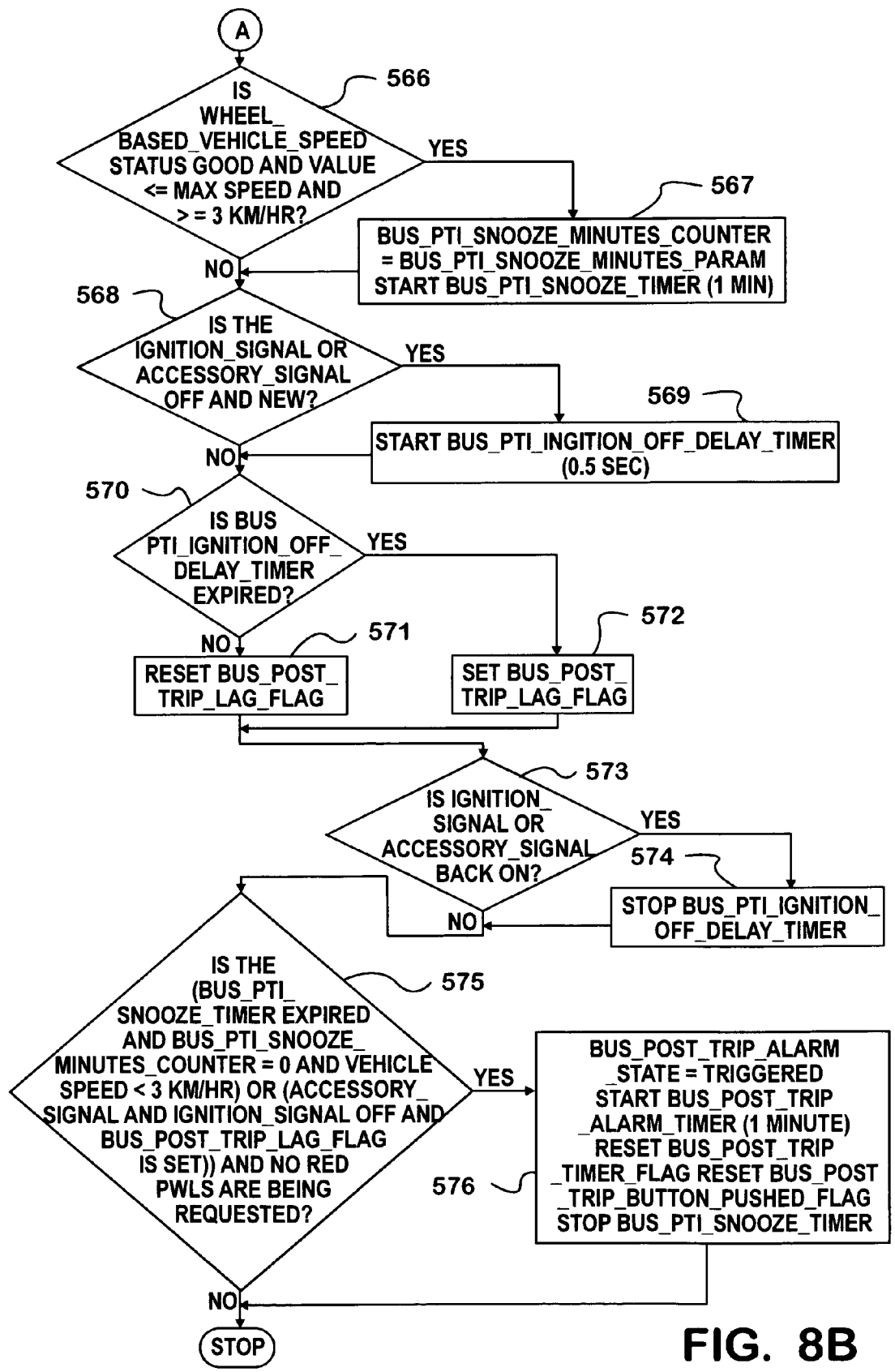

When step 562 determines that BUS_PTI_Snooze_Timer has expired and that the BUS_PTI_Snooze_Minutes_Counter is greater than zero, then steps 563 and 564 are performed before steps in FIG. 8B are executed. Step 563 decrements BUS_PTI_Snooze_Minutes_Counter by one, thereby subtracting one minute from the number of minutes remaining. Step 564 determines if BUS_PTI_Snooze_Minutes_Counter is greater than zero. If it is, then a step 565 starts BUS_PTI_Snooze_Timer to count down another 60 seconds. If it is not, then step 565 is omitted.

A first step 566 in FIG. 8B determines if the bus is moving at a speed greater than some minimum, 3 kilometers per hour in this embodiment, and less than some maximum. Step 566 also determines if the source of the speed data is good. If that status is good and speed is in the range between the minimum and maximum, then a step 567 sets BUS_PTI_Snooze_Minutes_Counter to BUS_PTI_Snooze_Minutes_Param and also starts BUS_PTI_Snooze_Timer. Then a step 568 is performed.

When step 567 determines either that status is not good or speed is not within the range, then step 568 is performed immediately after step 566 with step 567 being omitted.

Step 568 determines the status of ignition switch 47. If either Ignition_Signal or Accessory_Signal is newly off, then a step 569 starts BUS_PTI_Ignition_Off_Delay_Timer with the same 0.5 second BUS_PTI_Ignition_Off_Delay_Const. If that is not the case, then step 569 is omitted.

A step 570 determines if BUS_PTI_Ignition_Off_Delay_Timer has expired, meaning having timed out. As long as that timer has not expired, BUS_Post_Trip_Lag_Flag is reset (step 571). A step 573 then determines if the Ignition_Signal or Accessory_Signal is "back on", meaning simply is the switch in IGNITION position or ACCESORY position. When step 570 determines that BUS_PTI_Ignition_Off_Delay_Timer has expired, a step 572 sets BUS_Post_Trip_Lag_Flag before step 573 is performed.

When step 573 determines that the Ignition_Signal or Accessory_Signal is "back on", a step 574 stops BUS_PTI_Ignition_Off_Delay_Timer before a step 575 is performed. If that is not the case, then step 575 is performed immediately after step 573 with step 574 being omitted.

By comparison of the sequence of steps 568, 569, 570, 571, 572, 573, and 574 with the sequence steps 513, 520, 514, 515, 521, 516, and 517, the description of the former sequence given earlier leads one to understand that the purpose of the latter sequence is to assure that the ignition switch is actually in either ACCESSORY position or IGNITION position.

Step 575 determines either if BUS_PTI_Snooze_Timer has expired, the count of BUS_PTI_Snooze_Minutes_Counter is zero, and bus speed is below the minimum 3 kilometers per hour or if ignition switch 47 is in OFF position and there is no pupil warning input 50. If either is true, then a step 576 returns the system to TRIGGERED state 106, starts BUS_Post_Trip_Alarm_Timer, resets BUS_Post_Trip_Timer_Flag, resets BUS_Post_Trip_Button_Pushed_Flag and stops BUS_PTI_Snooze_Timer.

If both are not true, the algorithm stops to await the next iteration.

The ability to place the alert system in SNOOZE state 108 by turning ignition switch 47 to either ACCESSORY or IGNITION position and then pressing snooze switch 57 provides a certain maximum amount of time, 20 minutes for example as set by BUS_PTL_Snooze_Minutes_Param, for the driver to temporarily switch the system out of the TRIGGERED state before either the system is disarmed or the alert is resumed. SNOOZE state 108 temporarily discontinues the alert that is being given, either high-level or low-level.

There may be situations during a trip where the alert should not be given because the driver shuts off motor 14 temporarily before the trip is completed. (Keep in mind that shutting off the motor with the system in ARMED state 104 changes the system state to TRIGGERED state 106 setting off the alert.) If conditions that caused the system state to change to SNOOZE state 108 remain unchanged for the allotted snooze time, i.e. 20 minutes, the system automatically reverts to TRIGGERED state 106 to prevent the system from being defeated. In the usual course of a trip before all pupils are either picked up or dropped off, motor 14 will be typically be restarted and the bus will again be driven within the allotted snooze time. Operation of the bus at or above 3 km/hr continually resets the BUS_PTI_Snooze_Minutes_ Counter to 20 minutes and keeps the system in SNOOZE state 108. The system state will change from SNOOZE state 108 to TRIGGERED state 106 when ignition switch 47 is again turned off at the end of the trip.

Whenever the algorithm proceeds through steps 501, 504, 511, 512, and 522 to step 550, and step 550 discloses that BUS_Post_Trip_State is not in SNOOZE state 108, a step 580 that is identical to step 502 occurs placing the system in DISABLED state 100.

While a presently preferred embodiment of the invention has been illustrated and described, it should be appreciated that principles of the invention are applicable to all embodiments that fall within the scope of the following claims.

What is claimed is:

1. A bus comprising:
a motor that propels the bus and that is turned on and off by an ignition switch that is selectively operable to at least OFF, IGNITION, and ACCESSORY positions;
a bus body comprising an interior and an exterior;
a driver's seat at one side of the interior at a front of the body;
an entrance/exit door at the other side opposite the driver's seat that, when open, allows passengers to board and exit;
an aisle running rearward from the front;
passenger seats adjacent the aisle;
an electrical system comprising signaling devices on the exterior of the bus body that, when activated, signal that the bus is stopping to allow passengers to enter or exit, one or more alert devices for giving alerts within and immediately surrounding the bus, and an electrical system controller (ESC) that processes data from various sources to provide output data for performing certain functions incidental to operation of the bus via various virtual controllers in the ESC,
one of which virtual controllers:
controls the alert devices by processing data indicating status of the entrance/exit door, data indicating status of the signaling devices, data indicating status of the ignition switch, and data indicating status of a disarming device disposed proximate a rearmost passenger seat;
is set from an UNARMED state to an ARMED state upon processing data disclosing concurrence of the ignition switch being in IGNITION position, the entrance/exit door being open, and the signaling devices being activated;
is set from ARMED state to a TRIGGERED state upon processing data disclosing concurrence of the ignition switch being operated out of IGNITION position and the signaling devices not being activated;
and is rendered capable of being reset from TRIGGERED state to UNARMED state upon processing data disclosing concurrence of operation of the disarming device and of the ignition switch being in ACCESSORY position.

2. A bus as set forth in claim 1 in which the one virtual controller, is reset from TRIGGERED state to UNARMED state upon processing data disclosing concurrence of operation of the disarming device, of the ignition switch being in ACCESSORY position, and of a parking brake of the bus being applied.

3. A bus as set forth in claim 2 in which operation of the disarming device is disclosed by the virtual controller first processing data that discloses that the disarming device is in non-actuated condition, then processing data that discloses that the disarming device is in actuated condition, and then processing data disclosing that the disarming device is in non-actuated condition.

4. A bus as set forth in claim 1 in which one alert device that is controlled by the one virtual controller issues a low-level alert within the interior of the bus body when the one virtual controller is in TRIGGERED state.

5. A bus as set forth in claim 4 in which the one alert device issues the low-level alert as an audible alert, and the one virtual controller also causes certain lamps on the exterior of the bus body to flash when in TRIGGERED state.

6. A bus as set forth in claim 5 in which the bus also comprises a horn controlled by the one virtual controller to sound a high-level alert when the one virtual controller is in TRIGGERED state for more a predetermined period of time, but not to sound at all in any of the other states.

7. A bus as set forth in claim 6 in which the one virtual controller continues to flash the certain lamps on the exterior of the bus body during TRIGGERED state.

8. A bus as set forth in claim 6 in which the one virtual controller comprises a timing function that commences with the onset of the TRIGGERED state and causes the one virtual controller to be reset to UNARMED state upon the one virtual controller processing data disclosing elapse of a predetermined amount of time timed by the timing function and failure of the disarming device to have been operated during that predetermined amount of time.

9. A bus as set forth in claim 4 in which the one virtual controller causes the one alert device to issue an alert within the interior of the bus body unique to the resetting of the one virtual controller to UNARMED state.

10. A method of operating an on-board alert system in a bus having a body containing passenger seats adjacent an aisle running from front to rear in the bus body in order to alert responsible personnel when the bus has not been checked at the conclusion of a trip for the presence of passengers who may have remained in the bus body after they should have exited, the method comprising:
processing in an electrical system controller (ESC) of the bus electrical system data indicating status of a passenger entrance/exit door that opens and closes at a side of the bus body, data indicating status of signaling devices on an exterior of the bus body, data indicating status of an ignition switch that turns on and off a motor for propelling the bus and that is selectively operable to at least OFF, IGNITION, and ACCESSORY positions, and data indicating status of a disarming device disposed proximate a rear end of the aisle;

setting the alert system from an UNARMED state to an ARMED state when the processing of data discloses concurrence of the ignition switch being in IGNITION position, the entrance/exit door being open, and the signaling devices being active;

setting the alert system from ARMED state to a TRIGGERED state when the processing of data discloses concurrence of the ignition switch being operated out of IGNITION position and the signaling devices not being active;

and rendering the alert system capable of being reset from TRIGGERED state to UNARMED state when the processing of data discloses concurrence of operation of the disarming device and of the ignition switch being in ACCESSORY position.

11. A method as set forth in claim 10 further including resetting the alert system from TRIGGERED state to UNARMED state when the processing of data discloses concurrence of operation of the disarming device, of the ignition switch being in ACCESSORY position, and of a parking brake of the bus being applied.

12. A method as set forth in claim 11 in which operation of the disarming device is disclosed by the virtual controller first processing data that discloses that the disarming device is in non-actuated condition, then processing data that discloses that the disarming device is in actuated condition, and then processing data disclosing that the disarming device is in non-actuated condition.

13. A method as set forth in claim 10 including causing one alert device in the electrical system to issue a low-level alert within the interior of the bus body when the alert system is in TRIGGERED state.

14. A method as set forth in claim 13 in which causing the one alert device to issue a low-level alert when the alert system is in TRIGGERED state comprises causing the one alert device to issue the low-level alert as an audible alert, and further including causing certain lamps on the exterior of the bus body to flash when the alert system in TRIGGERED state.

15. A method as set forth in claim 14 further including causing a horn of the bus to sound after the alert system has been in TRIGGERED state for a predetermined period of time for issuing a high-level alert, but not to sound at all in any of the other states.

16. A method as set forth in claim 15 including causing the certain lamps on the exterior of the bus body to continue flashing during TRIGGERED state.

17. A method as set forth in claim 14 including starting a timing function at the commencement of the TRIGGERED state and causing the alert system to be reset to UNARMED state when the processing of data discloses elapse of a predetermined amount of time timed by the timing function and failure of the disarming device to be operated during that predetermined amount of time.

18. A method as set forth in claim 13 including causing the one alert device to issue an alert within the interior of the bus body unique to the resetting of the alert system to UNARMED state.

19. A bus comprising:
a motor that propels the bus and that is turned on and off by an ignition switch that is selectively operable to at least OFF, IGNITION, and ACCESSORY positions;
a bus body comprising an interior and an exterior;
a driver's seat at one side of the interior at a front of the body;
an entrance/exit door at the other side opposite the driver's seat that, when open, allows passengers to board and exit;
an aisle running rearward from the front;
passenger seats adjacent the aisle;
an electrical system comprising signaling devices on the exterior of the bus body that, when activated, signal that the bus is stopping to allow passengers to enter or exit, one or more alert devices for giving alerts within and immediately surrounding the bus, and an electrical system controller (ESC) that processes data from various sources to provide output data for performing certain functions incidental to operation of the bus via various virtual controllers in the ESC,
one of which virtual controllers:
controls the alert devices by processing data indicating status of the entrance/exit door, data indicating status of the signaling devices, data indicating status of the ignition switch, data indicating status of a disarming device disposed proximate a rearmost passenger seat, and data indicating status of a switch proximate the driver's seat;
is set from a first state to a second state upon processing data disclosing concurrence of the ignition switch being in IGNITION position, the entrance/exit door being open, and the signaling devices being activated;
is set from the second state to a third state upon processing data disclosing concurrence of the ignition switch being operated out of IGNITION position and the signaling devices not being activated;
causes at least one of the alert devices to give an alert when in the third state;
is set from the third state to a fourth state upon processing data disclosing concurrence of the ignition switch being operated to either ACCESSORY position or IGNITION position and operation of the switch proximate the driver's seat; and
causes the at least one alert device that had been giving an alert in the third state to cease giving the alert in the fourth state.

20. A bus as set forth in claim 19 in which the one virtual controller is set from the third state to the first state upon processing data disclosing concurrence of operation of the disarming device and the ignition switch being in ACCESSORY position.

21. A bus as set forth in claim 20 in which the one virtual controller is set from the third state to the first state upon processing data disclosing concurrence of operation of the disarming device, the ignition switch being in ACCESSORY position, and a park brake of the bus being applied.

22. A bus as set forth in claim 19 in which the one virtual controller comprises a timing function that commences with the onset of the fourth state and causes the one virtual controller to be reset to the third state upon elapse of a predetermined amount of time timed by the timing function.

23. A bus as set forth in claim 22 in which the one virtual controller resets the timing function whenever the bus is traveling above a predetermined minimum speed.

* * * * *